United States Patent
Pechhold

Patent Number: 5,712,348
Date of Patent: Jan. 27, 1998

[54] MALEIC ACID COPOLYMERS WITH FLUORINATED THIOETHER END-CAP

[75] Inventor: Engelbert Pechhold, Chadds Ford, Pa.

[73] Assignee: E. I. Du Pont de Nemours and Company, Wilmington, Del.

[21] Appl. No.: 617,518

[22] Filed: Mar. 13, 1996

[51] Int. Cl.⁶ .......................................... C08F 8/14
[52] U.S. Cl. .................... 525/384; 525/326.2; 525/327.4; 526/206; 526/209; 526/224; 526/266; 526/348; 526/348.2; 526/348.6
[58] Field of Search .................... 526/224, 209, 526/206; 525/326.2, 327.4, 384

[56] References Cited

U.S. PATENT DOCUMENTS

| | | | |
|---|---|---|---|
| 3,790,344 | 2/1974 | Frickenhaus et al. | 8/165 |
| 4,574,139 | 3/1986 | Sato et al. | 525/61 |
| 4,591,591 | 5/1986 | Robertson | 514/254 |
| 4,592,940 | 6/1986 | Blyth et al. | 428/96 |
| 4,948,650 | 8/1990 | Fitzgerald et al. | 428/96 |
| 5,001,004 | 3/1991 | Fitzgerald et al. | 428/263 |
| 5,346,726 | 9/1994 | Pechhold | 427/393.4 |
| 5,460,887 | 10/1995 | Pechhold | 428/395 |

FOREIGN PATENT DOCUMENTS

| | | |
|---|---|---|
| 0 019 584 A | 11/1980 | European Pat. Off. |
| 0 129 143 A | 12/1984 | European Pat. Off. |
| 0 189 698 A | 8/1986 | European Pat. Off. |
| 0 329 899 A | 8/1989 | European Pat. Off. |
| 1291784 | 4/1972 | United Kingdom |

*Primary Examiner*—Fred Zitomer

[57] ABSTRACT

A copolymer having units of Formula II:

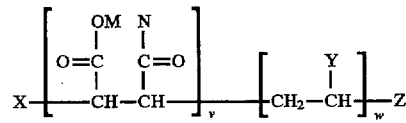

wherein

M is H, alkali metal, ammonium cation, or a mixture thereof;

N is OM or a mixture of OM, OR, and $NR_1R_2$ in a molar ratio of (OM):(OR):($NR_1R_2$) of $[1-(e+f)]$:e:f, wherein e and f are each independently 0 to 0.5, provided that (e+f) is less than 0.8;

R, $R_1$, and $R_2$ are each independently H or a branched or straight chain $C_{1-20}$ alkyl;

Y is a $C_{2-10}$ alkyl, $C_{6-12}$ aryl, or $C_{4-12}$ alkoxy;

X is a fluorinated thiol radical;

Z is H; and v and w are each a positive number such that the molar ratio of v to w is from about 0.4:1 to about 1.3:1 is disclosed.

4 Claims, No Drawings

MALEIC ACID COPOLYMERS WITH FLUORINATED THIOETHER END-CAP

BACKGROUND OF THE INVENTION

Polyamide, silk, and wool fibers are subject to soiling. Several of the currently used soil resist agents for nylon carpets are based on polymers derived from perfluoroalkylethyl alcohols. Typically the perfluoroalkylethyl alcohol derivatives are incorporated into acrylic or urethane polymers for application by padding or spraying to various substrates.

Additionally, polyamides, silk, and wool fibers are subject to staining by a variety of agents, particularly acid dyes such as FD&C Red Dye No. 40, commonly found in soft drinks. Various stain resist agents have been used, including polycarboxylic acid copolymers such as those derived from methacrylic acid or maleic acid and sulfonated phenol formaldehyde condensates. Such stain resist agents can be used alone or in combination. The hydrolyzed copolymers of terminal olefins with maleic anhydride are well known as stain resists. The use of blends of sulfonated phenol-formaldehyde condensates with terminal olefin/maleic acid copolymers as stain resists is also well known.

Sato and Yamauchi in U.S. Pat. No. 4,574,139, issued Mar. 4, 1986, disclose homopolymers prepared from a monomer capable of radical polymerization and having fluorine-containing end groups, derived from fluorinated thiols. Sato and Yamauchi list certain alpha-olefins, maleic anhydride, and maleic esters among the monomer choices, for preparation of homopolymers. However, homopolymers of these monomers are not effective as stain resists.

Usually the stain resist agents are applied from aqueous medium under conditions of controlled pH. The affinity or exhaust of the stain resist agents are the highest below pH of 3. Often surfactants are used to help solvate the stain resist agents at low pH.

Fluorochemical soil resist agents are known and are effective in protecting the fiber from soil but offer little protection from stains caused by acid dyes. Since the fluorochemical soil resist agents do not exhaust from aqueous solutions, they are usually applied in a separate operation from stain resists by either spraying, padding or foaming followed by a drying step. Co-application of stain resist and soil resist agents would be more economical. However, co-application of conventional stain resists and soil resists do not provide the desired properties.

It is desirable to have a choice of agents conferring both soil and stain resistance and which can be applied in a single step. This invention describes an agent that provides both soil and stain resistance and which can be applied in a one-step application.

SUMMARY OF THE INVENTION

The present invention comprises a composition comprising a copolymer having units of Formula II:

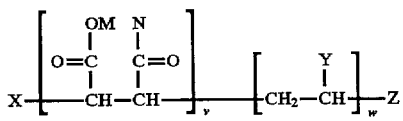

wherein

M is H, alkali metal, ammonium cation or a mixture thereof;

N is OM or a mixture of OM, OR, and $NR_1R_2$ in a molar ratio of (OM):(OR):($NR_1R_2$) of $[1-(e+f)]$:e:f, wherein e and f are each independently 0 to 0.5, provided that (e+f) is less than 0.8;

R, $R_1$, and $R_2$ are each independently H or a branched or straight chain $C_{1-20}$ alkyl;

Y is a $C_{2-10}$ alkyl, $C_{6-12}$ aryl, or $C_{4-12}$ alkoxy;

X is a fluorinated thiol radical;

Z is H; and v and w are each a positive number such that the molar ratio of v to w is from about 0.4:1 to about 1.3:1.

The present invention further comprises a process for providing soil resistance and resistance to staining by acid dyes to fibers comprising application of an effective amount of the composition of Formula II as defined above, optionally in the presence of other stain resists. Such a process includes topical application to a carpet in situ. The present invention further comprises a fiber to which has been applied a composition of Formula II as defined above.

The present invention further comprises a process for the preparation of a composition of Formula II as defined above comprising steps 1) and 2) as follows:

1) reacting maleic anhydride with a $C_{4-12}$ alpha-olefin in the presence of a fluorinated thiol of Formula I

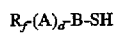

wherein $R_f$ is a fully fluorinated straight or branched chain $C_{3-14}$ aliphatic radical optionally interrupted by at least one oxygen atom;

A is a divalent radical selected from the group consisting of $-SO_2N(R_3)-$, $-CON(R_3)-$, $-S-$, and $-SO_2-$ wherein $R_3$ is H or $C_{1-6}$ alkyl;

d is 0 or 1; and

B is a divalent linear hydrocarbon radical $-C_nH_{2n}-$ wherein n is 2 to about 12;

to yield a maleic anhydride/alpha-olefin copolymer end-capped with X and Z wherein X and Z are as defined for Formula II, and 2) reacting said maleic anhydride/alpha-olefin copolymer with $R_4OH$ wherein $R_4$ is a $C_{1-18}$ alkyl, alkali metal ion, or ammonium cation to yield a composition of Formula II.

DETAILED DESCRIPTION OF THE INVENTION

The present invention comprises compositions that provide both soil and stain resistance, and which can be applied from an aqueous medium in a one-step application to polyamide substrates, such as nylon, silk, and wool carpeting, upholstery fabric, and other fibers. Specifically, the invention comprises incorporating perfluoroalkyl groups into maleic acid/terminal olefin copolymer stain resists by adding 0.5 to 50 mmole, and preferably 1 to 25 mmole, of a fluorinated thiol or mixture of fluorinated thiols per mole of the maleic anhydride and terminal olefin comonomers.

The fluorinated thiol has the structure of Formula I:

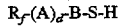

wherein $R_f$ is a fully fluorinated straight or branched aliphatic radical optionally interrupted by at least one oxygen atom.

A is a divalent radical selected from —SO$_2$N(R)—, —CON(R)—, —S—, or —SO$_2$—, wherein R is H or an alkyl radical having 1 to 6 carbon atoms, d is zero or 1, and B is a divalent linear hydrocarbon radical —C$_n$H$_{2n}$— wherein n is 2 to about 12, and preferably 2.

Preferably, R$_f$ contains at least 3 and not more than 14 carbon atoms. More preferably R$_f$ contains at least 5 and not more than 12 carbon atoms, and most preferably at least 7 and not more than 10 carbon atoms.

Representative fluorinated thiols have the structure:

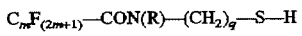
C$_m$F$_{(2m+1)}$—CON(R)—(CH$_2$)$_q$—S—H wherein R is H or an alkyl radical having 1 to 6 carbon atoms, m is 3 to 14, and q is 1 to 12;

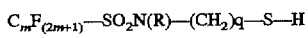
C$_m$F$_{(2m+1)}$—SO$_2$N(R)—(CH$_2$)$_q$—S—H wherein R, m, and q are as described above;

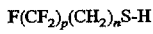
F(CF$_2$)$_p$(CH$_2$)$_n$S-H wherein n is as previously defined and p is 3 to 14, preferably 5 to 12, and most preferably 7 to 10;

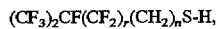
(CF$_3$)$_2$CF(CF$_2$)$_r$(CH$_2$)$_n$S-H, or

(CF$_3$)$_2$CF-O-(CF$_2$)$_r$(CH$_2$)$_n$S-H wherein n is as previously defined and r is 0 to 11, preferably 2 to 9, and most preferably 4 to 7;

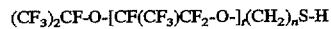
(CF$_3$)$_2$CF-O-[CF(CF$_3$)CF$_2$-O-]$_t$(CH$_2$)$_n$S-H wherein n is as previously defined and t is 0 to 5, preferably 1 to 4, and most preferably 2 to 3;

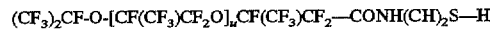
(CF$_3$)$_2$CF-O-[CF(CF$_3$)CF$_2$O]$_u$CF(CF$_3$)CF$_2$—CONH(CH)$_2$S—H wherein n is as previously defined and u is 0 to 4, and preferably 1 to 3; and

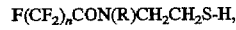
F(CF$_2$)$_n$CON(R)CH$_2$CH$_2$S-H, or

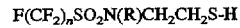
F(CF$_2$)$_n$SO$_2$N(R)CH$_2$CH$_2$S-H wherein n and R are as previously defined.

The thiol acts as a chain transfer agent. Thus the resulting copolymer chains have fluorinated thioether end caps, adding soil resist properties to the polyacid stain resist. Depending on the relative reactivities of the comonomers and the fluorinated thiol or fluorinated thiol mixture, 30% to 80% of the fluorinated thiol component is incorporated into the resultant polymer.

Chain transfer is a process wherein a growing polymer chain is terminated by hydrogen abstraction from, in this case, the thiol, leaving a fluorinated thio radical. This reactive thio radical then initiates a new copolymer chain. The resultant copolymer is end capped at one end by a fluorinated thioether group (identified as X in Formula II), and predominately with a hydrogen end cap at the other end (denoted as Z in Formula II). These structures are shown in Formula II, below, for the hydrolyzed, partially esterified, or partially amidated maleic anhydride/terminal olefin copolymer. The formula depicts only the ratio of comonomers in the copolymers and does not imply any sequence of monomers in the copolymer chain. Other end caps exist, derived for example from the polymerization initiator or Solvent.

While a copolymer chain without a fluorinated end cap would provide only stain resist properties, and not soil resist properties, the practice of this invention is to maximize the fluorine content of the copolymer. The maximum fluorine content is obtained by the use of a fluorinated thiol or thiols having a maximum molecular weight of about 700, and the use of the appropriate ratio of fluorinated thiol to the comonomers. Fluorinated thiols of molecular weight greater than about 700 are progressively less reactive and result in reduced fluorine incorporation into the copolymer.

A characteristic of the correctly prepared hydrolyzed, partially esterified, or partially amidated copolymer of the present invention, is the formation of clear aqueous solutions at concentrations of from about 5 to about 50%, and preferably 10 to 30%, by weight in water. If the fluorinated thio radical formed by hydrogen extraction is insufficiently reactive to re-initiate the copolymerization, it may eventually react with another radical, for instance another thiol radical, producing in this specific case the corresponding water-insoluble disulfide. A characteristic of an insufficiently reactive thiol is inefficient incorporation of the fluorine into the copolymer and the formation of cloudy aqueous solutions. The incorporation yield is defined as the amount of the thiol incorporated in the copolymer as calculated from the fluorine analysis, divided by the mount of thiol added to the monomer mix.

On the other hand, too large a molar proportion of a reactive fluorinated thiol causes excessive chain transfer, producing a copolymer having too low a molecular weight. Copolymers having excessively low molecular weight exhibit poor take-up on the fiber.

The number average molecular weight (Mn) of the copolymers of this invention ranges from about 500 to about 200,000 and preferably 1,500 to 5,000. After hydrolysis, partial esterification, or partial amidation, the copolymers of this invention have the schematic structure shown in Formula II, which shows the structure of the monomer units in the copolymer, but not their sequence:

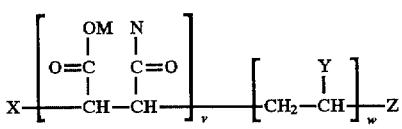

wherein

M is H, alkali metal, ammonium cation or a mixture thereof;

N is OM or a mixture of O—M, O—R, and NR$_1$R$_2$ in a molar ratio of (O—M):(O—R):(NR$_1$R$_2$) as [1–(e+f)]:e:f wherein e and f are individually 0 to 0.5, provided that (e+f) is less than 0.8;

R, R$_1$, and R$_2$ are each independently H or branched or straight chain alkyl groups having 1 to 20 carbon atoms;

X is a fluorinated thio radical;

Y is an alkyl group having 2 to 10 carbon atoms, an aryl group having 6 to 12 carbon atoms, or an alkoxy group having 4 to 12 carbon atoms, Z is H, and v is a whole or fractional positive number from 1 to about 1500, and w is a whole or fractional positive number from about 2 to about 600, provided that the molar ratio of v to w is from about 0.4:1 to about 1.3:1.

Preferably e and f are individually 0 to 0.3, provided that (e+f) is less than 0.6

X is a fluorinated thioester ether end cap, formed by hydrogen abstraction from the fluorinated thiol chain transfer agent. Examples of X are the radicals formed by removing the terminal hydrogen from the fluorinated thiols of Formula I as defined above. Z is predominately H, but in trace amounts, Z could be a radical formed from initiator or solvent.

For Y, suitable terminal olefin monomers include 1-alkenes; vinyl substituted aromatic monomers, or alkyl vinyl ethers, such monomers being exemplified by, but not limited to, 1-octene, styrene, and butyl vinyl ether. The ratio v:w is the molar ratio of maleic anhydride to that of the terminal olefin in the copolymer.

The preferred monomers for this invention are maleic anhydride is and a $C_4$ to $C_{12}$ alpha-olefin. The most preferred is maleic anhydride and 1-octene. The most preferred fluorinated thiol is perfluorodecylethyl thiol.

The hydrolyzed, partially esterified, or partially amidated maleic anhydride copolymers containing fluorinated thioether end caps of this invention of Formula II are prepared with maleic anhydride and one or more comonomers by reacting maleic anhydride with a $C_{4-12}$ alpha-olefin in the presence of a fluorinated thiol of Formula I as defined above to yield an intermediate copolymer. The intermediate copolymer is then reacted with $R_4OH$ wherein $R_4$ is a $C_{1-18}$alkyl, alkali metal ion, or ammonium cation to yield the copolymer of Formula II. The molar ratio of comonomer to maleic anhydride is between 0.4:1 and 1.3:1, and these are reacted in the presence of the selected fluorinated thiol in the amount of 0.5 to 50 mmole per mole of total monomers, and preferably 1 to 25 mmole per mole of total monomers. The polymerization is carried out in a polymerization vessel, optionally in a solvent such as methyl isobutyl ketone, under an inert atmosphere and at temperatures between 40° and 120° C. at ambient or elevated pressure depending on the comonomer and initiator type. An azo or peroxy radical initiator is used. Examples of suitable free radical initiators are 2-2'-azobis(3-methylbutyronitrile) such as "VAZO" 67 available from E. I. du Pont de Nemours and Company, Wilmington, Del., or t-butyl peroctoate available from Atochem, Buffalo, N.Y. The resulting intermediate maleic anhydride copolymers are then either hydrolyzed with aqueous base or further reacted with the proper amount of alcohol or amine to yield partial esters or partial amides of Formula II. The number average molecular weight ($\overline{Mn}$) of the copolymers of Formula II can range from about 500 to about 200,000 and preferably 1,500 to 5,000, and is controlled by the reactivity and concentration of the fluorinated thiol. The hydrolyzed, partially esterified, or partially amidated copolymers dissolve in water to give clear aqueous solutions containing perfluoroalkyl groups.

The hydrolyzed, partially esterified, or partially amidated copolymers of this invention provide both stain and soil resistance to polyamide, silk or wool fibers when applied from aqueous acidic solutions in a one-step application.

The hydrolyzed, partially esterified, or partially amidated copolymers of this invention are applied onto textiles and carpets by various methods well known in the art, such as by exhaust from an acidic aqueous bath as practiced in the Beck dyeing of carpets or by addition to an aqueous dye bath solution and exhaustion concurrently with the dye. They are also applied during continuous dyeing such as with KUSTER or OTTING carpet dyeing equipment. Other suitable methods include, but are not limited to, padding, foam, or spray application.

In a second embodiment, aqueous solutions of the hydrolyzed, partially esterified, or partially amidated copolymers of this invention are co-applied with other commercial stain resists based on phenolic resins or copolymers of methacrylic acid or maleic acid. Such co-application uses mixtures containing 5% to 95% of the hydrolyzed, partially esterified, or partially amidated copolymers of this invention.

The sulfonated phenol-formaldehyde condensation product stain resists that can be used in combination with the copolymers of this invention include any sulfonated hydroxy aromatic-formaldehyde condensation products which have been described in the prior art as being useful as dye-resist agents or dye-fixing agents, in other words, dye-reserving agents or agents which improve wet fastness of dyeings on polyamide fibers.

Examples of commercially available phenolic condensation products suitable for the invention are "BAYGARD" DT (a product of Bayer AG, Germany, a condensation product prepared from bis(4-hydroxyphenyl)sulfone, formaldehyde and phenol sulfonic acid and described in U.S. Pat. No. 3,790,344) and "ERIONAL" LY, a product of Ciba-Geigy Corp., Greensboro N.C., formed by condensing a mixture of naphthalene monosulfonic acid, bis(4-hydroxyphenyl)sulfone and formaldehyde and described in U.S. Pat. No. 3,716,393). The sulfonated hydroxyaromatic-formaldehyde products "ALGARD" NS from Allied Colloid Limited, UK; "DYAPOL" SB-40 from Yorkshire Chemical Co. Greenville S.C.; and "STAINFREE" from Sybron Chemicals, Inc. Wellford S.C., are also suitable.

The quantities of the stain/soil resists of this invention that are applied to the polyamide, wool or silk fiber or fabric are amounts effective in imparting stain and soil resistance. Such concentrations can be readily determined by those skilled in the art by using test methods which are well-known in the art, such as those set forth hereinbelow. For example, the stain/soil resists can be applied at a concentration in the range between 0.1 and 5.0% based on the weight of fiber or fabric (owf), preferably between 0.3 and 2.0% owf.

The pH of the application bath can range between 1.5 and 9. However, a pH range equal to or less than 4 is required for exhausting the hydrolyzed, partially esterified, or partially amidated copolymers of this invention onto the substrate. A lower pH of 2 to 3 is preferred. A surfactant is required for applications below pH 3 to provide for homogenous, stable aqueous bath solutions. The required amount of surfactant can be determined by one skilled in the art by observing the aqueous system in which it is used. Usually an amount of 10 to 100%, and preferably 20 to 50%, surfactant based on the amount of active ingredients of the stain/soil resists will be sufficient to retain homogenous bath solutions. Surfactants which are suitable for this application include alpha-olefin sulfonates such as "WITCONATE" AOS (Witco Corporation, Greenwich Conn.), "CALSOFT" (Pilot Chemical Co., Avenel N.J.), sodium lauryl sulfonate such as "DUPONOL" (Witco Corporation, Greenwich Conn.), and alkylated disulfonated diphenyl oxide such as "DOWFAX" (Pilot Chemical Co., Avenel N.J.) and "CALFAX" (Cytec Industries, Stamford Conn.). Mono- or polyvalent electrolytes, such as sodium sulfate and magnesium nitrate or sulfate may be added in amounts of 0.01 to 1% on the weight of the bath to improve the exhaust of the stain/soil resists.

1H,1H,2H,2H-perfluorooctanethiol, 1H,1H,2H,2H-perfluorodecanethiol, and 1H,1H,2H,2H-perfluorododecanethiol are described as LODYNE $R_f$ Mercaptans in Canadian Patent 1,242,217 assigned to Ciba-Geigy Corp. (Ardsley N.Y.). Other fluorinated mercaptans useful as chain transfer agents in this invention can be made from commercially available fluorinated carbonyl chlorides or fluorinated sulfonyl chlorides by reaction with aminoalkylthiols or hydroxyalkylthiols using conventional techniques.

Exhaust or fixation of the stain/soil resists is accomplished at bath or solution temperatures ranging from 20° to 100° C. over a period of a few seconds to one hour, preferably 50° to 85° C. for 5 seconds to 5 minutes. Often the thus treated fiber or fabric is steamed and/or heat treated to allow for optimum performance. The herein described stain/soil resists are also applied directly via a finish during fiber spinning, twisting or heat setting operation. The stain/soil resists of this invention are also applied in situ, between pH 2 to 10, to polyamide, polyester, polyolefin, or wool carpeting which has already been installed in a dwelling place, office or other location. They are applied as a simple aqueous preparation or in the form of aqueous shampoo preparation, with or without one or more polyfluoroorganic oil-, water-, and/or soil repellent materials.

Application of the hydrolyzed, partially esterified, or partially amidated copolymers of this invention, alone and in admixture with phenolic stain resists, to polyamide fibers and the testing of the treated substrate are described below.

Application Method

A white cut-pile carpet (5 g) constructed from 29 oz./square yard (0.98 kg/m$^2$) Superba-set BCF nylon 6/6 (available from E. I. du Pont de Nemours and Company, Wilmington Del.) was treated in a laboratory Beck-type apparatus for 10 minutes at 80° C. at a 20:1 liquor-to-goods ratio with a solution of a stain resist agent (stain resist agents are described in the examples) at a pH of 2 to give an application load of 1.1 % of weight fiber (owf) based on active ingredients. To the bath was occasionally added 2.0 g per liter of "MAGNAFLO"(an aqueous solution of magnesium nitrate, from Sybron Chemicals, Wellford S.C.). A surfactant (0.02 g) such as "DOWFAX" 2A-4 (Pilot Chemical Co., Avenel N.J.) or "WITCONATE" AOS (Witco Corporation, Greenwich Conn.) was added before pH adjustment. The carpet was then rinsed under tap water, partially de-watered by squeezing and dried in an forced-air oven for about 20 minutes at 121° C. (250° F.).

Stain Test

A carpet specimen (1.5×3.5 inch)(3.8×8.9 cm) was placed pile up on a flat non-absorbent surface. Ten ml of an aqueous red dye solution (0.2 g FD&C Red Dye No. 40 and 3.2 g citric acid in a volume of 1 liter) was poured into a 1-inch (2.54 cm) diameter cylinder which was tightly placed over the specimen. The cylinder was removed after all the liquid had been absorbed. The stained carpet specimen was left undisturbed for 24 hours, after which it was rinsed thoroughly under cold tap water and squeezed dry. The color of the specimen was measured with a Minolta Chroma Meter CR 200 (from Minolta Corporation, Ramsey N.J.) by determining the color difference "Delta a" between unstained and stained carpet samples. This method provides a highly accurate way to measure the degree of red stain of the carpet. The higher the "Delta a", the redder the stain. Results for control and example stain tests are shown in Tables 1 and 2 below.

Accelerated Soil Test (Drum Test)

Carpet specimens (1.5×3.5 inch)(3.8×8.9 cm) were mounted pile up with a 2-sided adhesive tape onto the inside of a metal drum 8 inch diameter, (20.3 cm) until the inside surface was completely covered by carpet. Into the drum was then placed the volume of 250 ml of dirty "SURLYN" ionomer resin pellets, made by blending 1-liter volume "SURLYN" 8528 ionomer resin (E. I. du Pont de Nemours and Company, Wilmington Del.) pellets with 20 g of synthetic soil (AATCC Method 123-1988), and 250 ml volume of 5/16 inch (0.19 cm) ball bearings. The drum was then closed and rolled on a roller-type drum mill for 3 minutes. The carpet samples were then removed from the drum and cleaned with a canister-type vacuum cleaner.

The degree of soiling was measured with a Minolta Chroma Meter CR 200 (from Minolta Corporation, Ramsey N.J.) by determining the difference in darkness as "Delta E" between the unsoiled control and the soiled carpet sample. The higher the "Delta E", the darker the sample. Differences of two "Delta E" units are visually distinguishable. Results for control and example soil tests are shown in Tables 1 and 2 below.

Table 1 shows the performance of an untreated carpet sample (Control), Comparative Examples A and B, and Examples 1 through 3 without co-applied phenolic stain resist. Table 2 shows the performance of untreated carpet, Comparative Examples A and B, and Examples 1 through 3 co-applied with phenolic stain resists. The ratio of phenolic stain resist to the copolymers of this invention was 20:80.

COMPARATIVE EXAMPLES

Comparative Examples A and B do not have a fluorinated thiol end cap, denoted as X in Formula II of the present invention.

Comparative Example A

Into a polymerization vessel was charged 29.4 g (0.3 mole) of maleic anhydride, 30.1 g (0.3 mole) of n-butyl vinyl ether, 0.6 g of 1-dodecanethiol, and 75 g of methyl isobutyl ketone. The reaction mixture was agitated under nitrogen and heated to 95° C. T-butyl peroctoate (6 ml) was slowly added via a syringe pump over a 1 hour period. After agitation for 24 hours at 95° C., no residual n-butyl vinyl ether was detected by gas chromatographic (GC) analysis and the reaction mass was allowed to cool to room temperature. A small amount of the product was dried at reduced pressure (10–20 Pa) at 70°–80° C. to give a dark brown solid melting at 67°–82° C. and having a number average molecular weight 11,786 and a ratio of MW/Mn̄ of 1.17 by gel permeation chromatography (polystyrene standard). The remaining product was hydrolyzed with dilute sodium hydroxide by heating for 1 hour at 75° C. and the solvent removed under reduced pressure (40–80 Pa) to give a brownish liquid containing 15.0% of active ingredients.

Comparative Example B

Into a polymerization vessel was charged 294 g (3 moles) of maleic anhydride, 235 g of 1-octene (2.09 moles), 6.0 g of 1-dodecanethiol, and 750 g of methyl isobutyl ketone. The reaction mixture was agitated under nitrogen and heated to 95° C. T-butyl peroctoate initiator (42 ml) was slowly added via a syringe pump over a 4 hour period. After agitation at 95° C. for 20 hours, no maleic anhydride was detected by GC analysis and the reaction mass was allowed to cool room temperature. A small amount of the product was dried at reduced pressure (10–20 Pa) at 70°–80° C. to give an amber resin melting at 138°–153° C. and having a number average molecular weight of 3,320 and a MW/M n̄ ratio of 1.97 by gel permeation chromatography (polystyrene standard). The remaining product was hydrolyzed with dilute sodium hydroxide by heating for 3 hours at 75° C. and the solvent removed under reduced pressure (40–80 Pa) to give a clear amber solution containing 21.3% of active ingredients.

EXAMPLES

Example 1

Into a polymerization vessel was charged 24.5 g (0.25 mole) of maleic anhydride, 26.0 g (0.25 mole) of styrene, 1.3 g of 1H,1H,2H,2H-perfluorodecanethiol (2.7 mmole), and 50 g of methyl isobutyl ketone. The reaction mixture was agitated under nitrogen and heated to 95° C. T-butyl peroctoate initiator (1.5 ml) was slowly added via a syringe pump over a 1 hour period. A subsequent exotherm required repeated cooling. A polymer separated from the solvent as viscous mass. No styrene was detected in the solvent layer after 3 hour of agitation at 95° C. A small amount of polymer was removed and dried under vacuum (10–20 Pa) at 80° C. The resulting solid melted at 189°–204° C., contained 1.49% of fluorine, and had a number average molecular weight of 25,300 and a ratio of MW/M̄n of 2.44 by gel permeation chromatography (polystyrene standard). The remaining polymer was separated from the solvent and hydrolyzed in dilute sodium hydroxide to give after standing at room temperature a hazy, viscous solution containing 15.9% of active ingredients and 0.075% of fluorine, which corresponded to 29% of the original fluorothiol.

Example 2

Into a polymerization vessel was charged 19.6 g (0.2 mole) of maleic anhydride, 20.0 g of n-butyl vinyl ether (0.2 mole), 0.8 g of 1H,1H,2H,2H-perfluorodecanethiol (1.7 mole), and 50 g of methyl isobutyl ketone. The reaction mixture was agitated under nitrogen and heated to 75° C. Two charges of 0.2 g of "VAZO"67 initiator (E. I. du Pont de Nemours and Company, Wilmington Del.) were added over a 2 hour period. The subsequent exotherm was controlled by repeated cooling. The reaction mass became increasingly viscous and after 4 hours no residual n-butyl vinyl ether was detected by GC analysis and the product was allowed to cool to room temperature. A small amount of polymer was isolated by drying at 80° C. under reduced pressure (10–20 Pa) as an amber solid melting at 170°–180° C. and having a number average molecular weight of 1,260 and a ratio of MW/M̄n of 2.4. The remaining product was hydrolyzed with dilute sodium hydroxide by heating for 1 hour at 75° C. before removal of the solvent under reduced pressure (40–80 Pa) to give a yellow turbid aqueous solution containing approximately 15.9% active ingredients. After standing overnight at room temperature a small amount of solids separated from the hazy solution containing 0.073% fluorine which corresponded to 35% of the original fluorothiol.

Example 3

Into a polymerization vessel was charged 20.5 g (0.205 mole) of maleic anhydride, 16.5 g (0.147 mole) of 1-octene, 1.0 g of 1H,1H,2H,2H-perfluorodecanethiol (2.1 mmole), and 52 g of methyl isobutyl ketone. The reaction mixture was agitated under nitrogen and heated to 95° C. T-butyl peroctoate initiator (4.5 ml) was slowly added via a syringe pump over a 2 hour period. No maleic anhydride was detected by GC analysis after holding for 19 hours at 95° C. and the reaction product was allowed to cool to room temperature. A small amount of the product was dried under reduced pressure (10–20 Pa) at 70°–80° C. to give a solid resin melting at 125°–134° C. and having a number average molecular weight of 2,398 and a ratio of MW/M̄n of 1.78 by gel permeation chromatography (polystyrene standard). The remaining product was hydrolyzed with dilute sodium hydroxide by heating for 1 hour at 75° C. and the solvent removed at reduced pressure (40–80 Pa) to give an amber liquid containing 15% active ingredients and 0.165% fluorine which corresponded to about 70% of the originally fluorothiol.

Example 4

Into a polymerization vessel was charged 294 g (2.94 moles) of maleic anhydride, 232.0 g (2.07 moles) of 1-octene, 11.0 g of a mixture of 48% of 1H,1H,2H,2H,-perfluorodecanethiol (11 mmole) and 52% of 1H,1H,2H,2H-perfluorododecanethiol (9.9 mmole), and 500 g of methyl isobutyl ketone. The reaction mixture was agitated under nitrogen and heated to 95° C. T-butyl peroctoate initiator (42 ml) was slowly added via a syringe pump over a 4 hour period. No maleic anhydride was detected by GC analysis after holding the reactants for 21 hours at 95° C. and the reaction mass was allowed to cool to room temperature. A small amount of the product was dried under reduced pressure (10–20 Pa) at 70°–80° C. to give an amber resin containing 1.15% of fluorine and having a number average molecular weight of 3,490 and a ratio of MW/M̄n of 1.96 by gel permeation chromatography (polystyrene standard). The remaining product was hydrolyzed with dilute sodium hydroxide by heating for 3 hours at 75° C. and the solvent was removed at reduced pressure (40–80 Pa) to give a slightly hazy amber liquid containing 23.3% of active ingredients and containing 0.169% of fluorine which corresponded to about 56% of the original fluorothiol.

Example 5

Into a polymerization vessel was charged 20.5 g (0.205 mole) of maleic anhydride, 16.5 g (0.147 mole) of 1-octene, 0.8 g of 1H,1H,2H,2H-perfluorooctanethiol (2.1 mmole), and 52 g of methyl isobutyl ketone. The reaction mixture was agitated under nitrogen and heated to 95° C. T-butyl peroctoate initiator (4.5 ml) was slowly added via a syringe pump over a 1 hour period. No maleic anhydride was detected by GC analysis after holding the reactants for 17 hours at 95° C. and the reaction product was allowed to cool to room temperature. A small amount of the product was dried under reduced pressure (10–20 Pa) at 70°–80° C. to give an amber resin melting at 125°–135° C., containing 1.30% of fluorine, having a number average molecular weight of 2,920 and a ratio of MW/M̄n of 1.85 by gel permeation chromatography (polystyrene standard). The remaining product was hydrolyzed with dilute sodium hydroxide by heating for 1 hour at 75° C. and the solvent removed at reduced pressure (40–80 Pa) to give an amber liquid containing 16.0% active ingredients and 0.123% fluorine, which corresponded to about 60% of the original

TABLE 1

Stain and Soil Resistance

| Example # (a) | Fluorine analysis (ppm) (b) | Stain Delta a | Soil (c) Delta E |
| --- | --- | --- | --- |
| Control (no treatment) | — | 39 | 28 |
| Example A (d) | — | 10 | 20 |
| Example B (d) | — | 2 | 19 |
| Example 1 | 80 | 5 | 15 |

TABLE 1-continued

Stain and Soil Resistance

| Example # (a) | Fluorine analysis (ppm) (b) | Stain Delta a | Soil (c) Delta E |
|---|---|---|---|
| Example 2 | 70 | 7 | 17 |
| Example 3 | 80 | 1 | 14 |

(a) All applications at 1.1% owf on white cut-pile 1150 Superba-set BCF nylon at pH 2.0 and 80° C.
(b) Fluorine analysis as found on treated carpet.
(c) Drum soiling.
(d) Copolymer made without fluorinated thiol.

TABLE 2

Stain and Soil Resistance of Blends with 20% Phenolic Stain Resists

| Example # (a) | Type of Phenolic | Fluorine analysis (ppm) (b) | Stain Delta a | Soil (c) Delta E |
|---|---|---|---|---|
| Control (no treatment) | — | — | 40 | 37 |
| Example A (d) | "ERIONAL" LY | — | 2 | 28 |
| | "BAYGARD" DT | — | 1 | 25 |
| Example B (d) | "ERIONAL" LY | — | 1 | 28 |
| | "BAYGARD" DT | — | 1 | 28 |
| Example 1 | "ERIONAL" LY | 110 | 4 | 15 |
| | "BAYGARD" DT | ND | 2 | 26 |
| Example 2 | "ERIONAL" LY | 90 | 5 | 16 |
| | "BAYGARD" DT | ND | 2 | 20 |
| Example 3 | "ERIONAL" LY | 110 | 1 | 15 |
| | "BAYGARD" DT | ND | 1 | 17 |

(a) All applications at 1.1% owf on white cut-pile 1150 Superba-set BCF nylon at pH 2.0 and 80° C.
(b) Fluorine analysis as found on treated carpet.
(c) Drum soiling.
(d) Copolymer made without fluorinated thiol.
ND Not determined.

What is claimed is:

1. A composition comprising a copolymer for providing soil resistance and resistance to staining by acid dyes to fibers, said copolymer having units of Formula II:

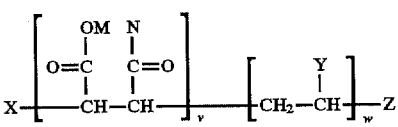

wherein

M is H, alkali metal, ammonium cation, or a mixture thereof;

N is OM or a mixture of OM, OR, and $NR_1R_2$ in a molar ratio of (OM):(OR):($NR_1R_2$) of [1–(e+f)]:e:f, wherein e and f are each independently 0 to 0.5, provided that (e+f) is less than 0.8;

R, $R_1$, and $R_2$ are each independently H or a branched or straight chain $C_{1-20}$ alkyl;

Y is a $C_{2-10}$ alkyl, $C_{6-12}$ aryl, or $C_{4-12}$ alkoxy;

X is a fluorinated thiol radical;

Z is H; and v and w are each a positive number such that the molar ratio of v to w is from about 0.4:1 to about 1.3:1.

2. The composition of claim 1 wherein Y is a $C_6$ alkyl.

3. The composition of claim 1 wherein X is a fluorinated thiol radical of Formula $$R_f\text{-(A)}_d\text{-B-S-}$$

wherein $R_f$ is a fully fluorinated straight or branched chain $C_{3-14}$ aliphatic radical optionally interrupted by at least one oxygen atom;

A is a divalent radical selected from the group consisting of —$SO_2N(R_3)$—, —$CON(R_3)$—, —S—, and —$SO_2$— wherein $R_3$ is H or $C_{1-6}$ alkyl;

d is 0 or 1; and

B is a divalent linear hydrocarbon radical —$C_nH_{2n}$— wherein n is 2 to about 12.

4. A process for the preparation of a composition comprising a copolymer having units of Formula II:

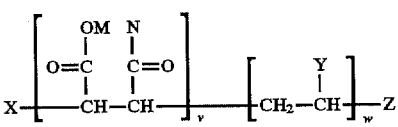

wherein

M is H, alkali metal, ammonium cation, or a mixture thereof;

N is OM or a mixture of OM, OR, and $NR1R2$ in a molar ratio of (OM):(OR):($NR_1R_2$) of [1–(e+f)]:e:f, wherein e and f are each independently 0 to 0.5, provided that (e+f) is less than 0.8;

R, $R_1$, and $R_2$ are each independently H or a branched or straight chain $C_{1-20}$ alkyl;

Y is a $C_{2-10}$ alkyl, $C_{6-12}$ aryl, or $C_{4-12}$ alkoxy;

X is a fluorinated thiol radical;

Z is H; and v and w are each a positive number such that the molar ratio of v to w is from about 0.4:1 to about 1.3:1;

said process comprising 1) reacting maleic anhydride with a $C_{4-12}$ alpha-olefin in the presence of a fluorinated thiol of Formula I $$R_f\text{-(A)}_d\text{-B-SH} \quad \text{I}$$

wherein $R_f$ is a fully fluorinated straight or branched chain $C_{3-14}$ aliphatic radical optionally interrupted by at least one oxygen atom;

A is a divalent radical selected from the group consisting of —$SO_2N(R_3)$—, —$CON(R_3)$—, —S—, and —$SO_2$— wherein $R_3$ is H or $C_{1-6}$ alkyl;

d is 0 or 1; and

B is a divalent linear hydrocarbon radical —$C_nH_{2n}$— wherein n is 2 to about 12;

to yield a maleic anhydride/alpha-olefin copolymer end-capped with X and Z wherein X and Z are as defined for Formula II, and 2) reacting said maleic anhydride/alpha-olefin copolymer with $R_4OH$ wherein $R_4$ is a $C_{1-18}$ alkyl, alkali metal ion, or ammonium cation to yield a composition of Formula II.

* * * * *